(12) United States Patent
Nakano

(10) Patent No.: US 7,585,931 B2
(45) Date of Patent: *Sep. 8, 2009

(54) OPTICALLY ACTIVE HIGH-MOLECULAR COMPOUNDS

(75) Inventor: Tamaki Nakano, Nara (JP)

(73) Assignee: Japan Science And Technology Corporation, Saitama (JP)

( * ) Notice: Subject to any disclaimer, the term of this patent is extended or adjusted under 35 U.S.C. 154(b) by 700 days.

This patent is subject to a terminal disclaimer.

(21) Appl. No.: 10/513,658

(22) PCT Filed: May 7, 2003

(86) PCT No.: PCT/JP03/05726

§ 371 (c)(1),
(2), (4) Date: Nov. 8, 2004

(87) PCT Pub. No.: WO03/102039

PCT Pub. Date: Dec. 11, 2003

(65) Prior Publication Data

US 2005/0234267 A1    Oct. 20, 2005

(30) Foreign Application Priority Data

May 8, 2002    (JP) .............................. 2002-132599

(51) Int. Cl.
*C08F 20/00*    (2006.01)
*C08G 63/02*    (2006.01)
(52) U.S. Cl. ...................................... 528/272; 525/437
(58) Field of Classification Search ................ 528/272; 525/437
See application file for complete search history.

(56) References Cited

U.S. PATENT DOCUMENTS

| 3,536,781 A | 10/1970 | Cotter et al. |
| 4,012,251 A | 3/1977 | Turner |

FOREIGN PATENT DOCUMENTS

| EP | 0 773 232 A | 5/1997 |
| EP | 1 411 067 A | 4/2004 |
| WO | WO 95/06274 A | 3/1995 |
| WO | WO 97/05184 A | 2/1997 |
| WO | WO 02/088202 | * 11/2002 |

* cited by examiner

*Primary Examiner*—Taofiq A Solola
(74) *Attorney, Agent, or Firm*—Millen, White, Zelano & Branigan, P.C.

(57) ABSTRACT

Disclosed are optically active high-molecular-weight compounds of the following formula

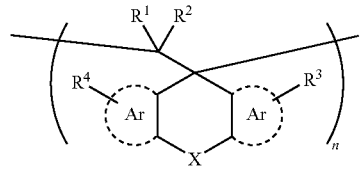

and stationary-phase materials containing the same. The high-molecular-weight compounds exhibit optical activity by virtue of their stacking helical structure wherein the aromatic groups are aligned in a twisted arrangement, thus being useful as optically active stationary phases for HPLC or polarized-light absorbers.

16 Claims, 1 Drawing Sheet

An initiation terminal model

A dimer of polymer model

OPTICALLY ACTIVE HIGH-MOLECULAR COMPOUNDS

FIELD OF THE INVENTION

Figure 1:
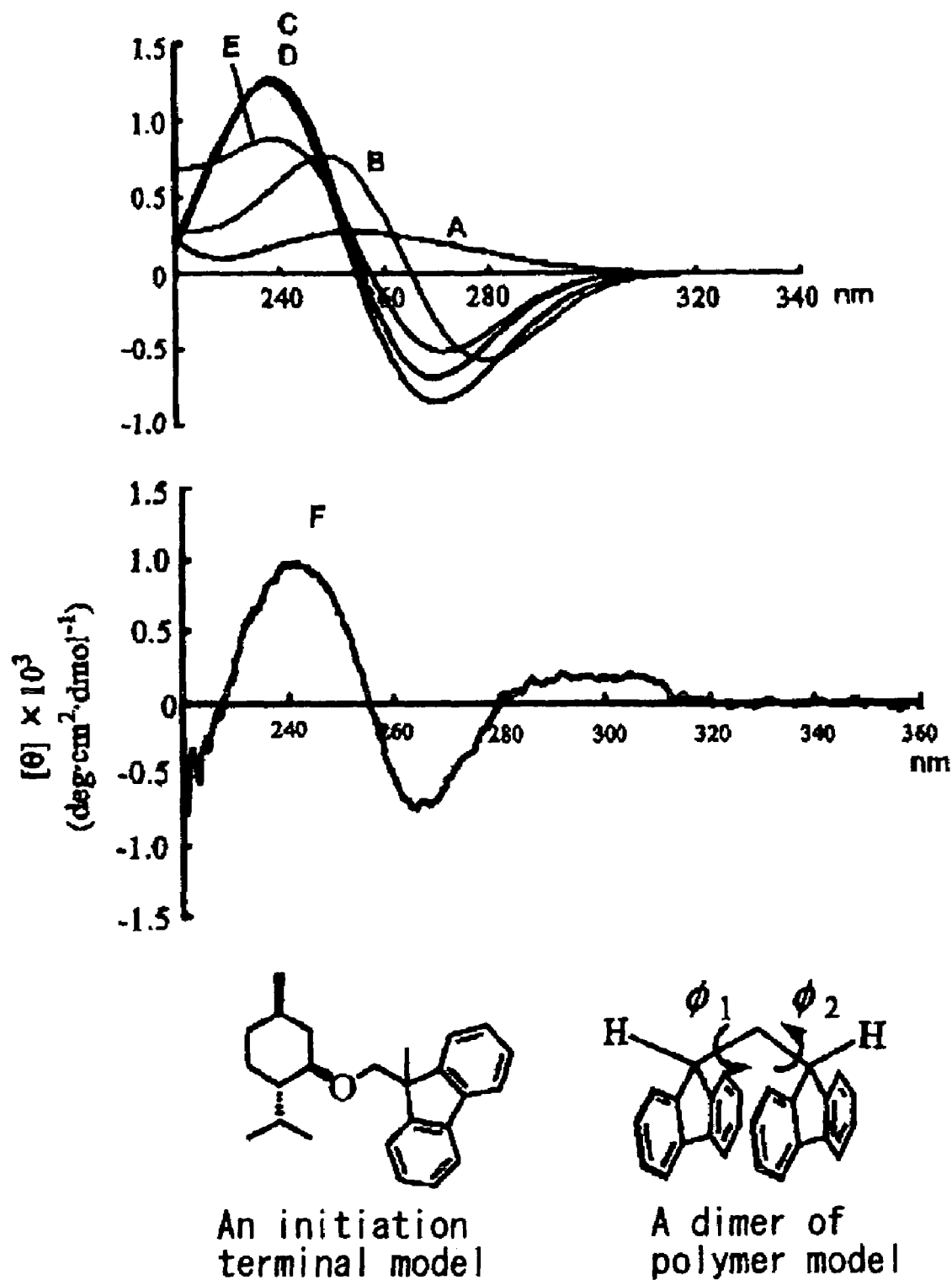

This invention relates to high-molecular-weight compounds which have aromatic groups such as fluorine residue in a side chain. In particular, it relates to high-molecular-weight compounds which exhibit optical activity by virtue of their stacking helical structure wherein the aromatic groups are aligned in a twisted arrangement, thus being useful as optically active stationary phase for HPLC or polarization absorption-light emitting materials, and a stationary phase material using the same.

BACKGROUND OF THE INVENTION

As described in Nakano, Preliminary reports of the 48th Annual Meeting of the Society of Polymer Science, Japan (Polymer Preprints, Japan, 48, (7), 1279(1999)), it is known that dibenzofulvene polymerizes and a polymer is obtained. However, in this case, the polymer does not show optical activity, because the polymerization-initiating agent which is not an optically active species is used. On the other hand, as described in "Generalities of Chemistry" No. 18, page 129-136 (1993), it is known that poly(triphenylmethyl methacrylate) shows optical activity. But this polymer has poor solvent-resistance, therefore, it is disadvantageous to use the polymer as an optically active stationary phase for HPLC. As described in Tokkai 2001-106729, an optically active maleimide polymer is already known. This polymer is excellent in solvent-resistance, however, it has disadvantage that its separation ability is poor.

The inventor made a detailed study on giving an optical activity to polymers of the above-mentioned dibenzofulvene or similar compounds thereof which are excellent in solvent-resistance. As a result, it was discovered that when dibenzofulvene or similar compounds thereof are polymerized by using an anionic polymerization initiator having an optically active alkyl group together with a chiral ligand, or when an optically active group-introduced dibenzofulvene or similar compounds thereof are polymerized by using an anion polymerization initiator, the obtained high-molecular-weight compounds show optical activity because main chains of them have a helical structure, which led to the present invention.

It is therefore a first object of this invention to provide a high-molecular-weight compound having excellent solvent resistance and showing optical activity.

It is a second object of this invention to provide an optically active stationary phase applicable to HPLC, having excellent solvent resistance.

SUMMARY OF THE INVENTION

The aforesaid objects of this invention are attained by optically active high-molecular-weight compounds represented by the following structural formula 1. When the high-molecular-weight compounds of this invention are used for an optically active stationary phase or the like, the high-molecular-weight compounds represented by the following structural formula 2 are preferable.

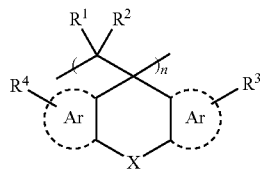

formula 1

In the formula, Ar is an aromatic ring, $R^1$ and $R^2$ are hydrogen atoms or organic groups, however, hydrogen atoms, alkyl groups, aromatic groups, —CN or ester groups are preferable. n is an integer of 2 or more, preferably 2-5,000 and 4-1,000 is most preferable.

X is a group selected from among —$(CH_2)_m$—, aromatic groups, vinylene groups, hetero atoms and functional groups containing hetero atoms. m is an integer of 0 or more.

$R^3$ and $R^4$ are substituents, and preferably hydrogen atoms, alkyl groups, aromatic groups, carboxyl groups, ester groups, ether groups, functional groups having an urethane bond, halogen atoms, hetero atoms, functional groups bonding to aromatic group through hetero atom, —CN and —(C=O)R, wherein R is a hydrogen atom, a hetero atom or an organic group. $R^3$ and $R^4$ may be introduced 2-4 times respectively. Each of $R^3$ and $R^4$ may be identical with or different from each other.

Further, $R^3$ and $R^4$ may be optically active functional groups. The optically active functional group is a functional group having an asymmetric carbon atom, or having neither a plane of symmetry nor S2 symmetry.

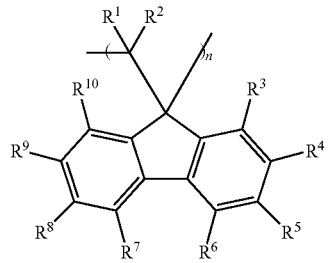

formula 2

In formula 2, n, $R^1$ and $R^2$ are the same as those of n, $R^1$ and $R^2$ in formula 1 and $R^3$-$R^{10}$ are the same groups as $R^3$ and $R^4$ in formula 1.

BRIEF DESCRIPTION OF THE DRAWINGS (FIG. 1)

A theoretical C,D spectra of an initiation terminal model (A) and a dimmer B of polymer model, and an observed CD spectrum (F) of the polymer obtained in the example.

MOST PREFERRED EMBODIMENT OF THE INVENTION

As a method obtaining a polymer described in claim 1 represented by the following structural formula 1, anionic polymerization is preferable, wherein anionic polymerization initiator having an optically active alkyl group or anionic polymerization initiator together with a chiral ligand is used.

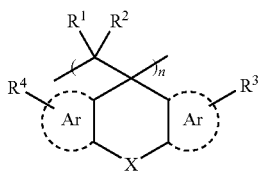

formula 1

The above-mentioned Ar is an aromatic ring, $R^1$ and $R^2$ are hydrogen atoms or organic groups. Preferable $R^1$ and $R^2$ are hydrogen atoms, alkyl groups, aromatic groups, —CN or ester groups, but hydrogen atoms, alkyl groups of $C_1$-$C_{10}$, phenyl groups and —CN are more preferable. n is an integer of 2 or more, but preferably 2-5,000 and more preferably 4-1,000. If n is less than 2, a stacking structure is not formed and if n is more than 5,000, the synthesis is difficult.

X is a group selected from among —$(CH_2)_m$—, an aromatic group, a vinylene group, a hetero atom or a group containing a hetero atom, and m is an integer larger than 0. As an example of the hetero atom of X, —O—, or —S— can be mentioned. As an example of the group containing a hetero atom, —NR— or —C(O)— etc. can be mentioned.

$R^3$ and $R^4$ are substituents and they are preferably hydrogen atoms, alkyl groups, aromatic groups, carboxyl groups, ester groups, ether groups, functional groups having a urethane bond, halogen atoms, functional groups linked with an aromatic group through a hetero atom, —CN or —(C=O)R. The hetero atom is N, S or O. In the present invention, particularly, hydrogen, an alkyl group having 1-20 carbon atoms, an aromatic group having 6-30 carbon atoms, a carboxyl group, an ester group having 2-30 carbon atoms, an ether group having 2-30 carbon atoms, a functional group of 2-30 carbon atoms having an urethane bond, F, Cl, Br, I, —NRR', —SR, —OR, —NO$_2$, —CN or a functional groups represented below are preferable, wherein R and R' are hydrogen atoms, hetero atoms or organic groups.

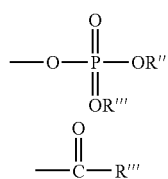

In the formulae, R", R'" and R"" are hydrogen atoms or organic groups.

Further, $R^3$ and $R^4$ may be the optically active functional groups. The optically active functional group is a functional group having an asymmetric carbon atom, or having neither a plane of symmetry nor S2 symmetry.

$R^3$ and $R^4$ may be introduced 2-4 times respectively. In this case, $R^3$ and $R^4$ may be identical with or different from each other.

Aforesaid anionic polymerization initiators having an optically active alkyl group are shown in 1 and 2 below, and aforesaid anionic polymerization initiators together with a chiral ligand are shown in 3 below.

1. R*M

In this case, R* is an optically active alkyl group and M is an alkali metal or alkaline earth metal. As an example of R*M, (−)—menthoxy potassium and (+)—menthoxy potassium can be mentioned.

2. RR*NM and RR*RM

In this case, R is an alkyl group, R* is an optically active alkyl group, M is an alkali metal or alkaline earth metal and N is a nitrogen atom. As examples of them, compounds below can be mentioned.

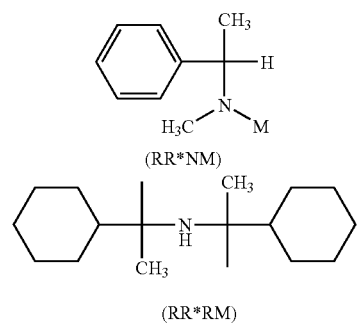

(RR*NM)

(RR*RM)

3. ROM/Chiral Ligand

In this case, R is an alkyl group, O is an oxygen atom, M is an alkali metal or alkaline earth metal. The chiral ligand is a diamino compound containing an optically active group and can be a bidentate ligand. Examples thereof are (+)—or (−)—sparteine, (+) —or (−)—1,4—bis(dimethylamino)—2,3—dimethoxybutane, (+) —or (−)—(1—pyrrolidinylmethyl)pyrrolidine, (+) —or (−)—(4S)—2,2'—(1—ethylpropylidene)bis[4—(1—phenylethyl)—4,5—dihydroxazole].

4. RM/R'XM' Complex

In this case, R is an alkyl group, X is an oxygen atom or nitrogen atom, M is an alkali metal or alkaline earth metal. R' is an optically active group. M' is an alkali metal or alkaline earth metal, which is identical with or different from M. Examples of R'X are (+)—or (−)—menthoxy group, 1—phenylethylamino group, 1—naphthylethylamino group and 2—(1—pyrrolidinylmethyl)pyrrolidine—1—yl group.

The above-mentioned anionic polymerization initiators may be used alone or in combination. When $R^3$ or $R^4$ in the formula 1 or $R^3$-$R^{10}$ in formula 2 are groups which do not have an optically active group, it is necessary to use these anionic polymerization initiators. However, a monomer of formula 1 having an optically active substituent which is introduced as $R^3$ or $R^4$ is used, a common anionic polymerization initiator which has no optical activity can be used, however, it is preferable to use the optically active anionic polymerization initiator. That is, even when polymerization initiators with no optical activity are used, a polymer having a stable optical activity is obtained, since a stacking structure of a side chain of the polymer is twisted because of an interaction between said optically active substituents.

Molecular weight of the polymer of the present invention is preferably 500-1 million in terms of number average molecular weight. If the molecular weight is 500 or less, a solvent resistance is low. It is difficult to polymerize so that the molecular weight is 1 million or more. A variance degree of molecular weight is preferably 1-3, particularly, 1-2 is more preferable. When the polymer having the variance degree of more than 3 is used as a stationary phase of a HPLC (high performance liquid column chromatography), separation ability of HPLC is poor.

The polymer of the present invention may be a copolymer obtained by polymerization with other polymerizable compound. Aforesaid other polymerizable compound is preferably a compound capable of anionic polymerization. Examples of the compound are acrylate a methacrylate, aminoalkyl acrylate such as N,N-dimethylaminoethyl acrylate, N,N-diethylaminoethyl acrylate and N,t-butylaminoethyl acrylate; (meth)acrylonitrile; butadiene; isoprene; a vinyl chloride; vinylidene chloride; vinyl acetate; vinyl ketone; N-vinylpyrrolidone; vinylpyridine; (meth)acrylamide; styrene compounds such as divinylbenzene; α-methylstyrene, vinyltoluene, chlorostyrene, t-butylstyrene and styrene; fumaric acid; maleic acid; itaconic acid; phthalic acid; monoalkyl esters of fumaric acid, dialkyl esters of fumaric acid; monoalkyl esters of maleic acid, dialkyl esters of maleic acid; monoalkyl esters of itaconic acid, dialkyl esters of itaconic acid; monoalkyl esters of phthalic acid, and dialkyl esters of phthalic acid. In addition, the copolymerization is, preferably a block copolymerization.

Further, a polymerizable compound having two functional groups or more can be copolymerized. Thus, properties such as a solvent resistance can be improved. A polymerizable compound having a photo polymerizably functional group can be copolymerized to cross link each other by a radiation of light after the copolymerization.

A stationary phase material described in claim 7 is a powder of the polymer compound itself of the present invention or a material obtained by coating the polymer compound of the present invention on a surface of a particle carrier. Examples of these materials are as follows;

1. A material obtained by crashing a polymer into powder wherein the polymer is one described in claim 1 or 2 and insoluble in a solvent. Particularly, an average diameter is preferably uniform.
2. A material wherein the polymer described in claim 1 or 2 is embedded or chemically bonded to a surface of a silica-gel or alumina.
3. A material wherein the polymer described in claim 1 or 2 is embedded or chemically bonded to a surface of a styrene bead.

EXAMPLES

Hereafter, this invention will be described in further detail referring to examples, but this invention is not to be construed as being limited in any way thereby.

Example 1

Polymerization of Dibenzofulvene using Menthoxy Potassium

Preparation of Initiator (Menthoxy Potassium)

0.3 g of KH (suspended in a paraffin) was introduced into a flame-dried ample wherein an air had been replaced by nitrogen. 10 ml of dried THF was introduced to the ample, thereby washing off the paraffin from KH and an upper liquid was removed by using a syringe. After repeating this operation three times, the resultant remainder was dried under a vacuum. (−)-menthol (312.5 mg, 2.00 mmol) was introduced into the ample and carried out the reaction, primarily, at room temperature for 2 hours, after that, at 50° C. for 3 hours. An upper liquid of the obtained reaction mixture was used as a polymerization initiator.

Polymerization

Dried THF solution of dibenzofulvene (0.46M, 4.4 ml, 2.02 m mol) was introduced into a flame-dried ample wherein an air had been replaced by nitrogen. The solution was further diluted by adding a dried THF (3.8 ml). After cooling the solution to −78° C., the THF solution of menthoxy potassium (2.0 ml of 0.2M), which was obtained by above-mentioned manner was added to initiate the polymerization and kept the solution still at −78° C. for 24 hours. After 24 hours, a methanol (0.2 ml) was added to the reaction mixture to stop the polymerization while keeping the temperature at −78° C.

A part of the reaction mixture was diluted with $CDCl_3$, then the $^1$H-NMR was measured, and the monomer conversion ratio was determined (monomer conversion ratio: >99%) from the intensity ratio of the absorption peak of the solvent used as internal reference to that of the vinyl proton in the remaining monomer. The solvent was distilled off from the reaction mixture to obtain a crude product. From the crude product, THF insoluble fraction (285.8 mg, 68%) and a THF soluble fraction were separated. Further, MeOH was added into the THF soluble fraction to reprecipitate and to obtain MeOH insoluble product (35.0 mg, 8%).

The THF-soluble, MeOH-insoluble fraction: Molecular weight: Mn=1070, Mw/Mn=1.47 (GPC, vs. polystyrene);

Absorption spectra: $\epsilon$=1960 (300 nm), $\epsilon$=5739 (264 nm), $\epsilon$=4559 (241 nm) [THF 25° C.];

circular dichroism: [θ]=176 (300 nm), [θ]=−738 (264 nm): [θ]=962 (241 nm) [THF, 25° C.];

optical rotation: $[\alpha]_{365}$ =0° (THF, C=0.30, 23° C.) [reference data (optical rotation of (−)-menthol): $[\alpha]_{365}$ =−149° (THF, C =0.49, 22° C.)]

By comparing the C,D spectra of the polymer obtained from the above experiment and C,D spectra obtained from theoretical simulation based on an assumption of torsional structure, it was proved that the polymer obtained from the above experiment had a torsional structure.

Theoretical simulation 1: The most stable conformation of 9-menthoxy-9-methyl fluorene, as a model compound of initiation terminal, was obtained by Monte Carlo simulation using MMFF field. Macro Model manufactured by Schroedinger co.,ltd was used for the simulation. An expected C,D spectra for the conformation was calculated by the semiempirical molecular orbital method INDO/S (FIG. 1A). For the calculation, the program provided by Dr. J. Downing of Colorado University was used (G. Bringmann etc, J. Am. Chem. Soc., 123, 2703-2711). Subsequently, as the polymer model, a dimer model was simulated and an expected C,D spectra for each model having dihedral angles Φ1 and Φ2 of 175°, 170°, 160° or 150° was calculated by the semiempirical molecular orbital method INDO/S (FIG. 1B-E). The actual spectrum (FIG. 1F) completely differed from that of the initiation terminal model (FIG. 1A). Thus, it was found that C,D spectra of the polymer obtained in the Example were not caused by menthoxy group at terminal of the polymer but were derived from the torsions of a main-chain (helical structure) of the polymer. Further, as the spectrum of FIG. 1F coincides well to C,D spectra of FIG. 1, it, is clarified that the torsion of main-chain has a dihedral angle of 170°-160°.

Example 2

Asymmetric Polymerization of 2,7-n-pentylDBF by Sp-F1Li

Preparation of Initiator

Fluorene (169.2 mg, 1.02 mol) was dissolved into a dried toluene (4.0 ml) in a flame-dried ample wherein an air had been replaced by nitrogen. A hexane solution of n-BuLi (1.6M, 0.64 ml) was slowly added into the obtained solution.

After 30 minutes from the addition at room temperature, (−)-sparteine (0.28 ml) was introduced to the ample. After shaking and agitating, the mixture was kept still for 10 minutes. Thus obtained reaction mixture was used as a polymerization initiator.

Polymerization

A dried hexane solution of 2,7-dipentyldibenzofulvene (0.97M, 1.05 ml, 1.02 mmol) was introduced into a flame-dried ample wherein an air had been replaced by nitrogen, then hexane was distilled off. A dried toluene (4.5 ml) was added to dissolve the monomer, then the solution was cooled to −78° C. and the initiator (0.2M, 0.25 ml) already prepared was added to the solution, thereby a polymerization started. The polymerization reaction was carried out for 24 hours at −78° C. After that, methanol (0.2 ml) was added to the reaction mixture while keeping at −78° C. to stop the polymerization.

After a fraction of the reaction mixture was diluted with $CDCl_3$, the $^1$H-NMR was measured, and the monomer conversion ratio was determined (monomer conversion ratio: 80%), from the intensity ratio of the absorption peak of the solvent used as internal reference to that of absorption of the vinyl proton in the remaining monomer.

The solvent was distilled off from the reaction solution to obtain a crude product. From the crude product, a THF insoluble fraction (90.5 mg, 27%) and a THF soluble fraction were separated. Further, MeOH was added into the THF soluble fraction to reprecipitate, and to obtain MeOH insoluble fraction (104.1 mg, 31%).

The THF-soluble, MeOH-insoluble fraction: Molecular weight, Mn=3600, Mw/Mn=1.17 (GPC, vs. polystyrene);

Absorption spectra: $\epsilon$=11841 (282 nm), $\epsilon$=12212 (274 nm) [THF, 25° C.] [reference data (monomer unit model, 2,7-n-phenylfluorene): $\epsilon$=20436 (282 nm), $\epsilon$=28315 (274 nm) [THF, r.t.]];

emission spectra, $\lambda_{max}$=403 nm, [$\lambda_{Ex}$=282 nm, THF, r.t.]]; [reference data (monomer unit model, 2,7-n-phenylfluorene): $\lambda_{max}$=315 nm [Ex.=282 nm, THF, r.t.];

circular dichroism, [θ]=−73, (318 nm): [θ]=426 (288 nm), [θ]=−450 (253 nm) [THF, 25° C.];

optical rotation $[α]_{365}$=−16 ° (THF, C=0.40, 22° C.)

Example 3

Polymerization of iBu-DBF by Sp,DDB-F1Li

Polymerization 2,7-diisobutyldibenzofulvene (291.0 mg 1.00 mmol) was dissolved into a dried toluene (4.5 ml) in a flame-dried ample wherein an air had been replaced by nitrogen. The solution was cooled to −78° C. and a solution of the initiator prepared in Example 2 (0.2M, 0.25 ml) was added, thereby a polymerization started. The polymerization reaction was carried out for 24 hours at −78° C. MeOH (0.2 ml) was added to the reaction mixture while keeping at −78° C. to stop the polymerization. A part of the reaction mixture was diluted with $CDCl_3$, then the $^1$H-NMR was measured, and the monomer conversion ratio was determined (monomer conversion ratio: 41%) from the intensity ratio of the absorption peak of the solvent used as internal reference to that of the vinyl proton in the remaining monomer. The solvent was distilled off from the reaction mixture to obtain a crude product. From the crude product, a THF insoluble fraction (19.3 mg, 7%) and a THF soluble fraction were separated. Further, MeOH was added into the THF soluble fraction to reprecipitate and to obtain MeOH-insoluble fraction (120.1 mg, 40%).

The THF-soluble, MeOH-insoluble fraction: Molecular weight, Mn=3300, Mw/Mn=1.10 (GPC, vs. polystyrene);

Absorption spectra, $\epsilon$=11244 (294 nm), $\epsilon$=10574 (274 nm) [THF, 25° C.] [reference data (monomer unit model, 2,7—n—phenylfluorene): ($\epsilon$=7074 (294 nm), $\epsilon$=30021 (274 nm) [THF, r.t.]);

Emission spectra, $\lambda_{max}$=405 nm [Ex.=294 nm, THF, r.t.,] [reference data (monomer unit model, 2,7-iso-butylfluorene); $\lambda_{max}$=315 nm [Ex.=294 nm, THF, r.t.];

Circular dichroism, [θ]=604 (319 nm), [θ]=−289 (285 nm), [θ]=500 (255 nm)] [THF, 25° C.]:

Optical rotation, $[α]_{365}$=+31° (THF, C=0.37, 25° C.).

Example 4

Chiral Separation of the Polymer Produced in Example 1

A THF-insoluble product (10 mg) of the polymer produced in Example 1 was crushed in a mortar and introduced in a glass tube with a screw cap. After an addition of ethanol solution (0.5 mg/ml, 100 μl (solute: 0.05 mg)) containing racemic body of trans-stilbene oxide, Tröger's base and flavanone, the glass tube was sealed and kept still at room temperature (23° C.). 10 μl of a solution part in the tube was analyzed by an HPLC having a chiral column (Chiral cell OD—H, Daicel chemical industries, ltd., eluent: hexane/2—propanol (95/5)) Then, an adsorption amount and an optical purity of the solution part were determined and separation factors $α_1$ and $α_2$ were calculated (table 1).

In the table, the separation factors were calculated by the following expressions based on the two definitions. The polymer showed an asymmetric separation ability for each racemic body.

$α_1$={(major antipode in the solution (%))/(minor antipode in the solution(%))}
/{(major antipode in the sample adsorbed (%))/(minor antipode in the sample adsorbed (%))}
={(major antipode in the solution (%) )/(minor antipode in the solution(%)}
/{(50-major antipode in the solution (%))/(50-minor antipode in the solution(%))} wherein major antipode in the solution (%) =(100-adsorption rate (%))×(100+|optical purity of the sample in the solution|)/2×1/100, minor antipode in the solution (%) =(100-adsorption rate (%))×(100+|optical purity of the sample in the solution|)/2×1/100

$α_2$=(major antipode in the solution (%))/(minor antipode in the solution (%))

TABLE 1

An asymmetric separation ability of polymer obtained in Example 1[a]

| Test | Racemic body | Adsorption period | Adsorption rate[a] (%) | Optical purity of solute in the solution | Separation factor $α_1$ | $α_2$ |
|---|---|---|---|---|---|---|
| 1 | Trans-stilbene oxide | 38 | 22.7 | 6.2 | 1.73 | 1.13 |
| 2 | tröger's base | 18 | 8.9 | 1.6 | 1.41 | 1.03 |
| 3 | flavanone | 18 | 37.1 | 7.2 | 1.47 | 1.15 |

[a]adsorption test at room temperature

Comparative Example 1

0.5 m mol of dibenzofulvene was dried under vacuum for 30 minutes, then dissolved it in 3 ml of THF which had been distilled to remove air. To the obtained solution, 0.025 m mol of n-BuLi as a polymerization initiator was added and a reaction was carried out for 24 hours at −78° C. 2 ml of methanol was added to the solution to stop the reaction, then a hexane-insoluble fraction was obtained by using a centrifugal separator.

When optical rotation was measured in the same manner as the Example, the optical rotation was 0°.

INDUSTRIAL APPLICABILITY

The high-molecular-weight compound having optical activity of the present invention has an excellent solvent resistance, therefore, it is suitable for an optically active stationary phase applicable to HPLC and for a polarization absorption-light emitting material.

What is claimed is:

1. An optically active high-molecular-weight compound of the following formula

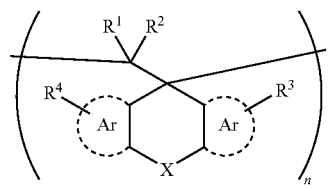

wherein,

Ar is a benzene ring, $R^1$ $R^2$ are, each independently, hydrogen, —CN, an alkyl group, or an ester group, $R^3$ and $R^4$ are, each independently, hydrogen, halogen, an alkyl group, carboxyl group, ester group, ether group, —CN or —(C=O)R, n is an integer of 2 to 5000, X is —$(CH_2)_m$—, a vinylene group, N, S, O, —NR— or —C(O)—, m is an integer of 0 or 1, $R^3$ and $R^4$ may be introduced 2-4 times respectively, wherein these may be identical or different, and R is hydrogen, N, S or O, which compound is optically active.

2. An optically active high-molecular-weight compound according to claim 1, wherein n is an integer of 4 to 1000.

3. An optically active high-molecular-weight compound according to claim 1, which is a copolymer obtained by polymerization reaction of compounds having two or more polymerizably functional groups.

4. An optically active high-molecular-weight compound according to claim 1, which is a crosslinked polymer.

5. An optically active high-molecular-weight compound according to claim 1, wherein $R^1$ and $R^2$ are, each independently, hydrogen, an alkyl group having 1 to 10 carbon atoms, or —CN.

6. An optically active high-molecular-weight compound according to claim 1, wherein $R^3$ and $R^4$ are, each independently,
hydrogen,
an alkyl group having 1-20 carbon atoms,
a carboxyl group,
an ester group having 2-30 carbon atoms,
an ether group having 2-30 carbon atoms,
F, Cl, Br, I or
—CN.

7. An optically active high-molecular-weight compound according to claim 1, wherein $R^3$ and $R^4$ are, each independently,
hydrogen,
an alkyl group having 1-20 carbon atoms,
a carboxyl group,
an ester group having 2-30 carbon atoms,
an ether group having 2-30 carbon atoms,
F, Cl, Br, I,
—CN, or

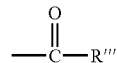

wherein
R'''' is hydrogen.

8. An optically active high-molecular-weight compound according to claim 1, wherein
m is 1.

9. An optically active high-molecular-weight compound according to claim 1, wherein
X is —$(CH_2)_m$—, and
m is 0.

10. An optically active high-molecular-weight compound according to claim 1, wherein
R is hydrogen or O.

11. A stationary phase material, comprising a high-molecular-weight compound according to claim 1.

12. An optically active high-molecular-weight compound according to claim 1, wherein
X is —$(CH_2)_m$-, N, S, O, —NR— or —C(O)—.

13. An optically active high-molecular-weight compound according to claim 1, wherein
$R^1$ and $R^2$ are, each independently, hydrogen, or —CN.

14. An optically active high-molecular-weight compound according to claim 1, wherein
$R^1$ and $R^2$ are, each independently, hydrogen, or an alkyl group having 1 to 10 carbon atoms.

15. A stationary phase material, comprising a high-molecular-weight compound according to claim 9.

16. A stationary phase material according to claim 11, which is prepared by embedding or fixing through a chemical bond said high-molecular-weight compound on a silica-gel, an alumina or polystyrene bead.

* * * * *

UNITED STATES PATENT AND TRADEMARK OFFICE
CERTIFICATE OF CORRECTION

PATENT NO.       : 7,585,931 B2                                                    Page 1 of 1
APPLICATION NO. : 10/513658
DATED            : September 8, 2009
INVENTOR(S)      : Tamaki Nakano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Fourteenth Day of September, 2010

David J. Kappos
*Director of the United States Patent and Trademark Office*